United States Patent [19]
Heidebroek et al.

[11] Patent Number: 5,270,823
[45] Date of Patent: Dec. 14, 1993

[54] RUN/STANDBY CONTROL WITH SWITCHED MODE POWER SUPPLY

[75] Inventors: Wolfgang Heidebroek; Chun H. Wu, both of Singapore, Singapore

[73] Assignee: Thomson Consumer Electronics, S.A., Courbevoie, France

[21] Appl. No.: 906,872

[22] Filed: Jul. 2, 1992

[30] Foreign Application Priority Data

Jul. 3, 1991 [GB] United Kingdom ............... 9114354

[51] Int. Cl.⁵ ............................................. H04N 5/63
[52] U.S. Cl. .................................. 358/190; 315/411; 358/243
[58] Field of Search ................ 358/190, 243, 74; 315/411, 380

[56] References Cited

U.S. PATENT DOCUMENTS

| | | | |
|---|---|---|---|
| 4,524,411 | 6/1985 | Willis | 358/190 |
| 4,737,851 | 4/1988 | Shanley, II et al. | 358/190 |
| 5,036,261 | 7/1991 | Testin | 358/190 |
| 5,093,605 | 3/1992 | Meinertz | 358/190 |

Primary Examiner—James J. Groody
Assistant Examiner—John W. Miller
Attorney, Agent, or Firm—Joseph S. Tripoli; Joseph J. Laks; Daniel E. Sragow

[57] ABSTRACT

A television receiver has a switched mode power supply for regulating output voltages including the B+ output to a flyback transformer, by generation of output pulses to a power transformer. A controller for the power supply is coupled in two feedback loops, one responsive to a pulse width modulator coupled to the flyback transformer and the other comparing the output voltage with an internal reference for free running operation. The first feedback loop takes precedence and is active in the run mode of the television receiver. In the standby mode when horizontal rate pulses are absent, the second feedback loop takes over. The second feedback loop has a different reference level than the first, such that when switching from the run mode to the standby mode a transition interval occurs in which no pulses are output by the controller, thereby causing the B+ voltage to the flyback transformer to fall. During this transition interval, horizontal scanning signals continue at falling amplitude, and a signal is input to the kinescope drivers, thereby collapsing the picture and draining the ultor voltage on the screen anode. The reoccurrence of controller pulses when the output voltage of the power transformer has fallen to the new lower reference level is used to positively switch operation of the receiver at the conclusion of the transition interval.

28 Claims, 7 Drawing Sheets

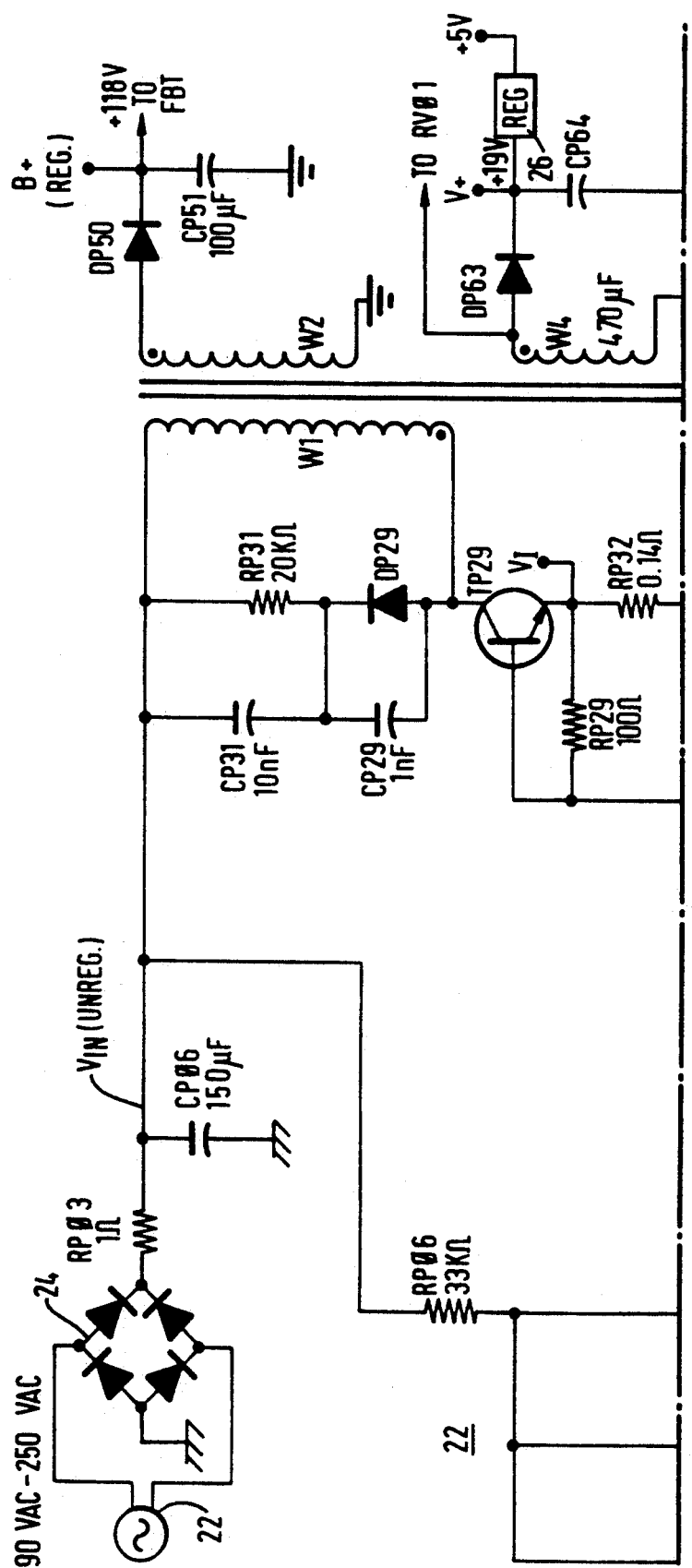
FIG.1 (1/3)

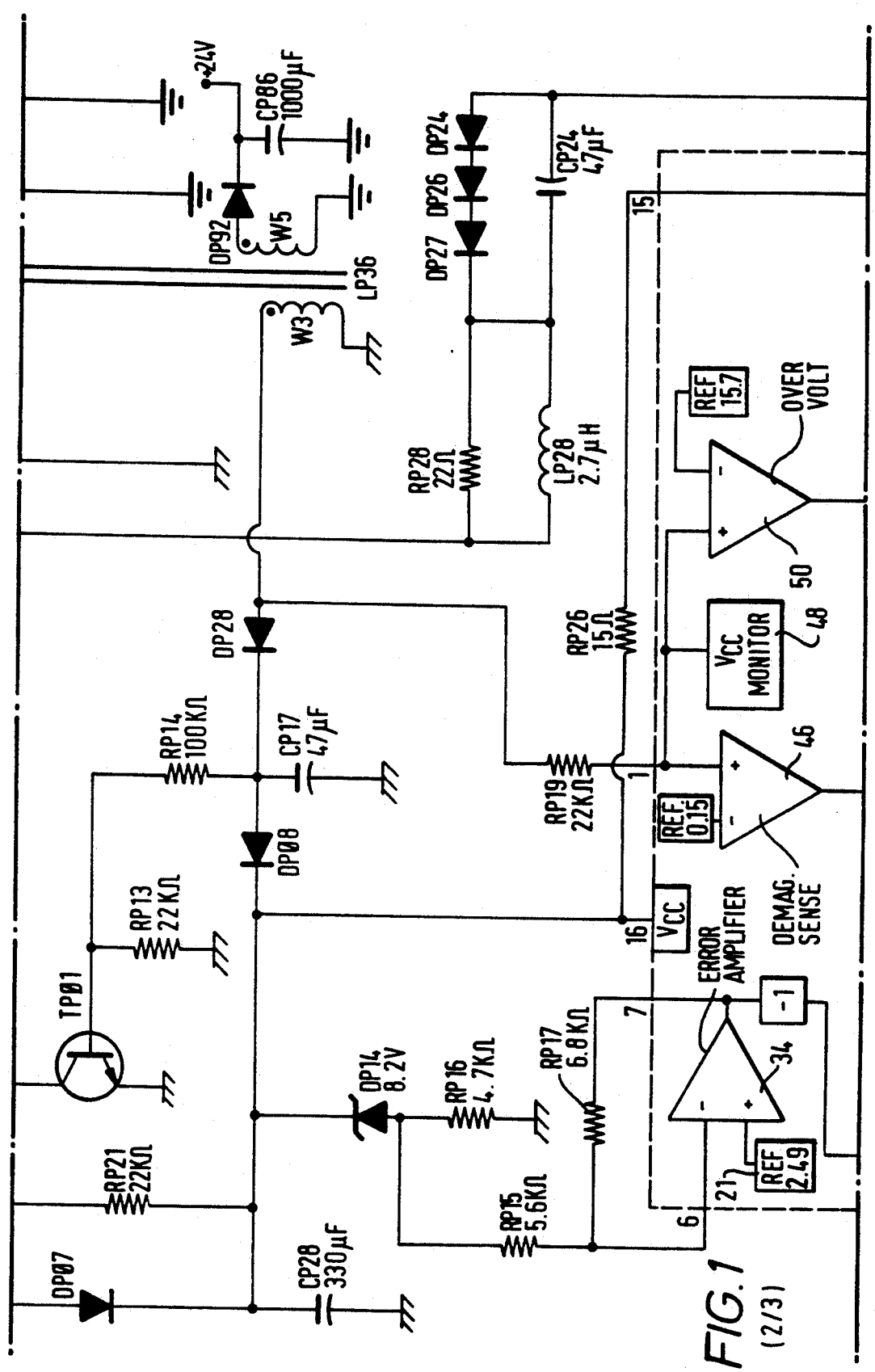
FIG.1 (2/3)

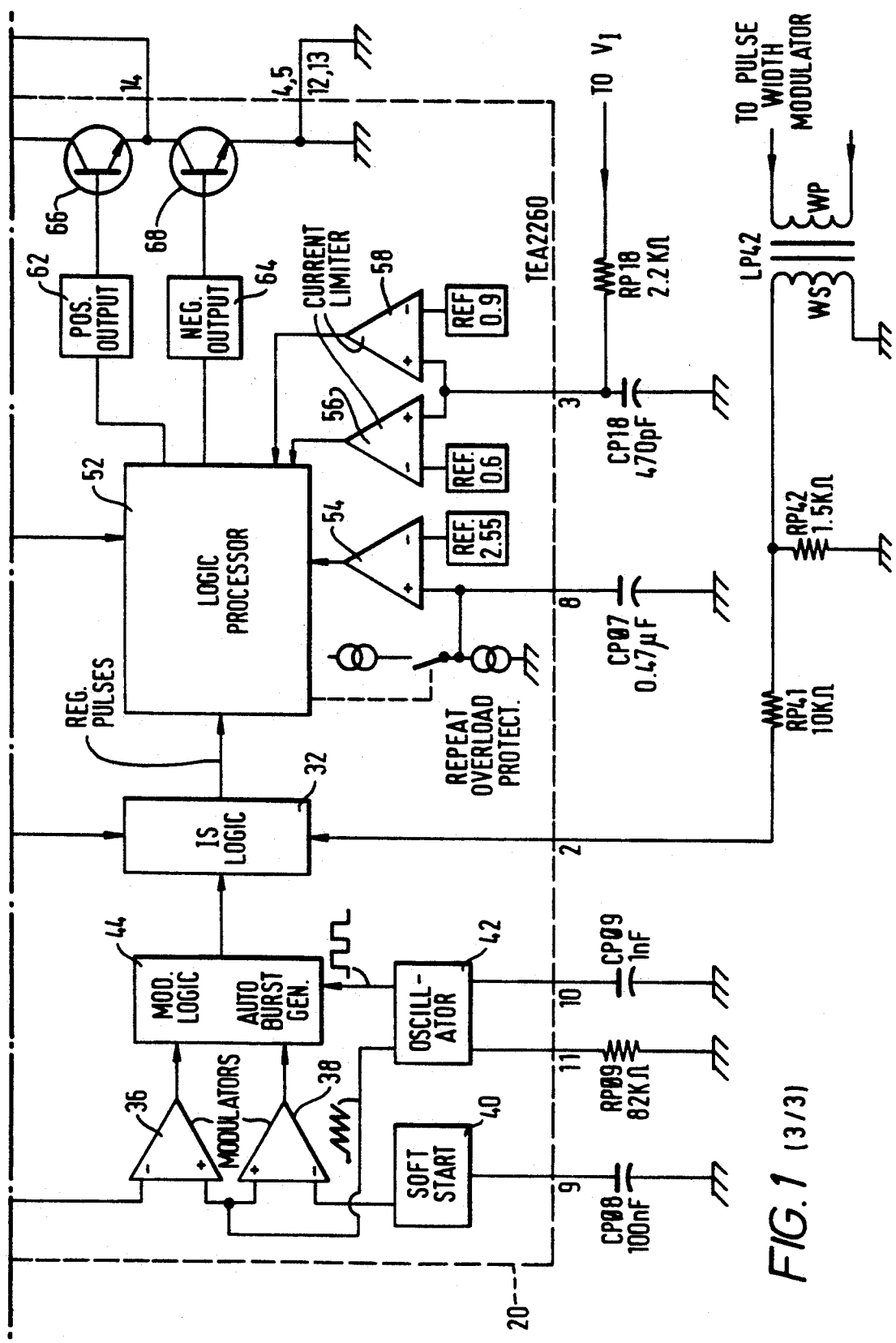
FIG. 1 (3/3)

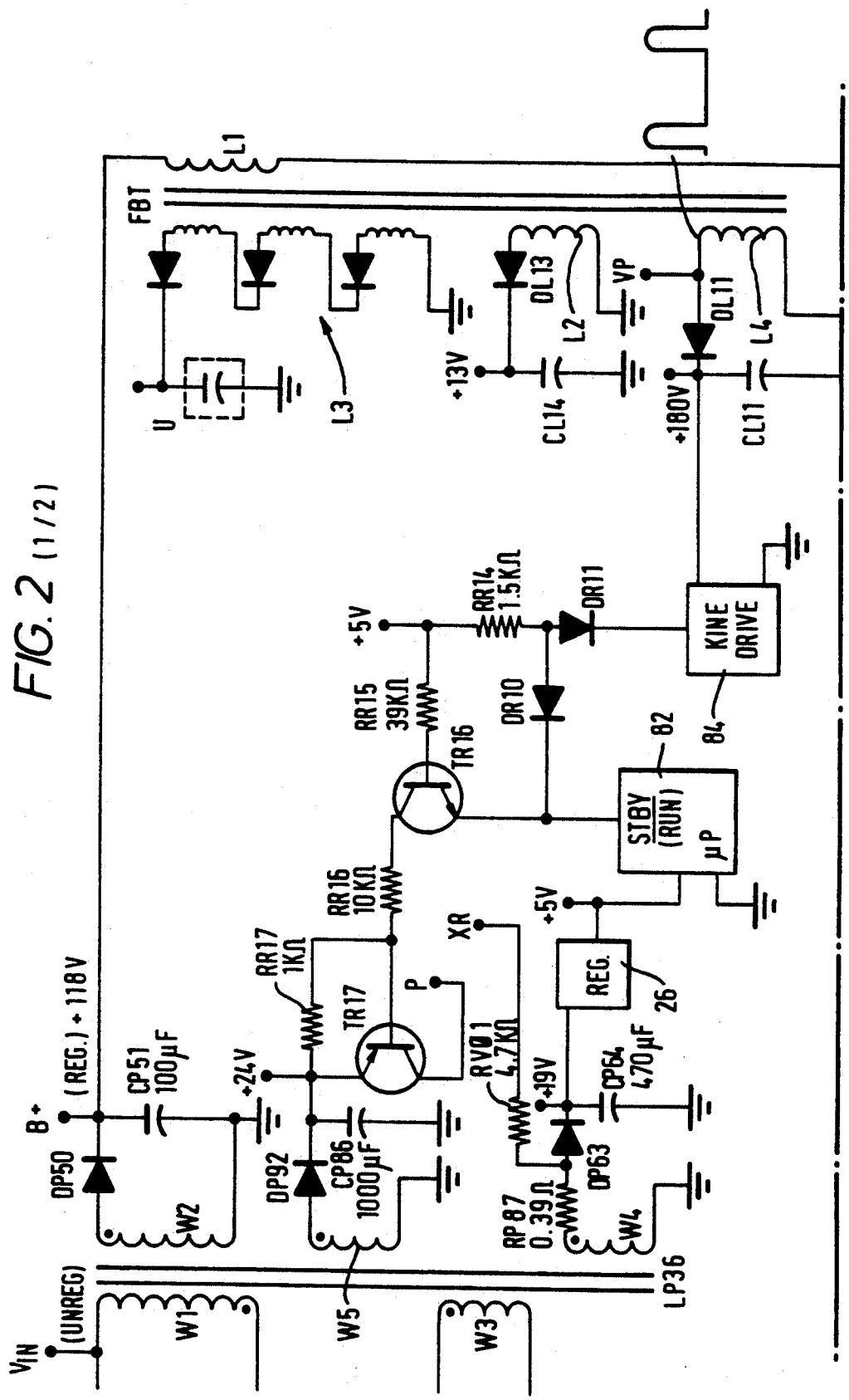
FIG. 2 (1/2)

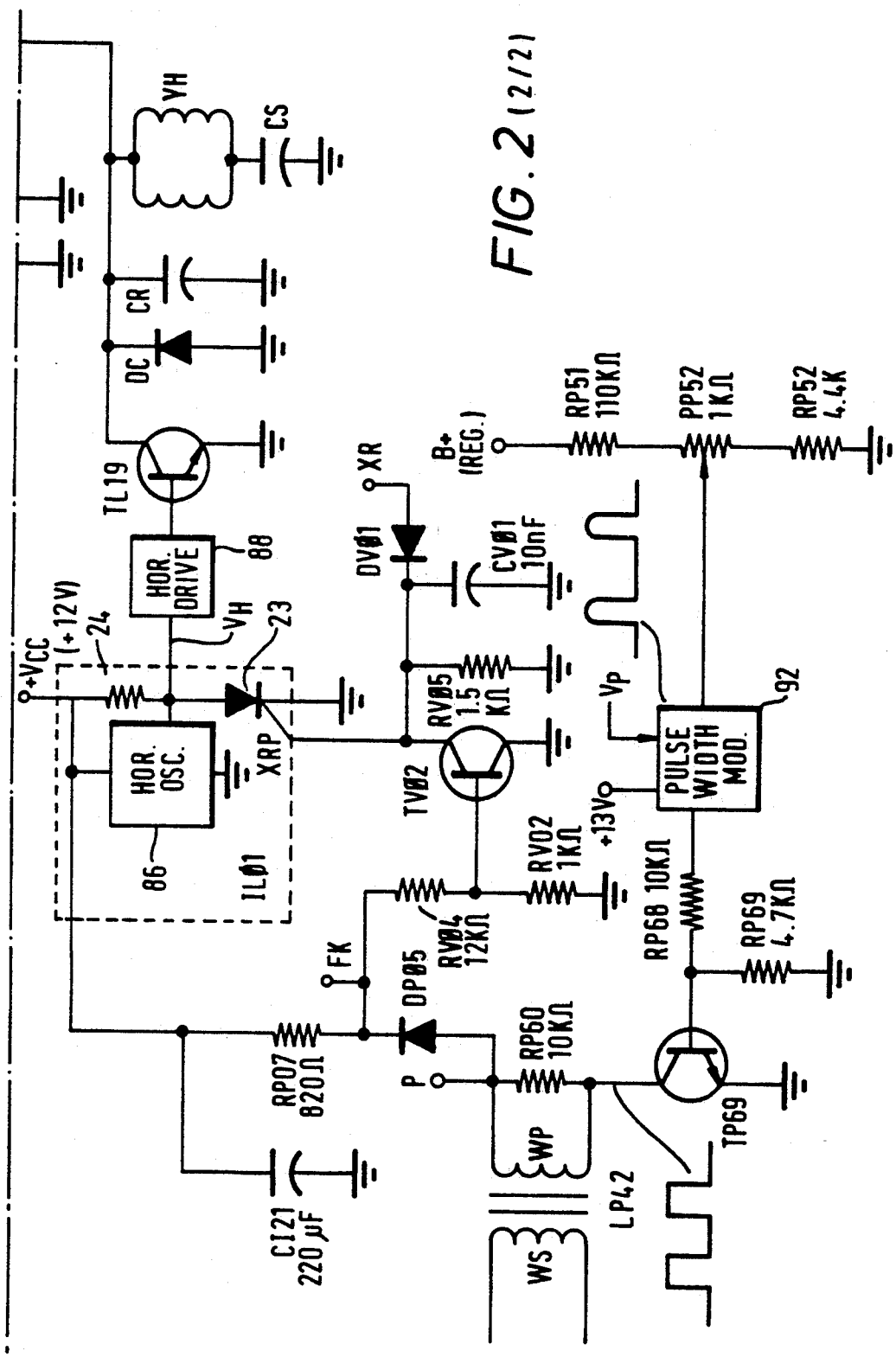
FIG. 2 (2/2)

RUN/STANDBY CONTROL WITH SWITCHED MODE POWER SUPPLY

The invention relates to a television receiver having a run mode, in which the receiver is fully operational, and a standby mode, in which horizontal scanning is disabled to stop generation of power to operational loads such as the deflection circuit and flyback transformer.

A switched mode power supply couples a variable amount of power from an unregulated DC supply to load circuits coupled to secondary windings of a power transformer. In conjunction with a pulse width modulator, a power supply controller applies pulses to the primary winding of the transformer via a power transistor. By feeding back the voltage level at a given secondary winding and varying the pulse width to maintain the voltage at that secondary winding equal to a reference level, the power supply regulates the voltage in all the secondary windings.

An example of a switched mode power supply controller is SGS-Thomson Microelectronics type TEA2260 described in an Application Note of SGS-Thomson Microelectronics, Central Application Laboratory, Grenoble, dated April 1989, entitled, "TEA2260 High Performance Driver Circuit For SMPS". The pulses applied to the primary winding of the power supply transformer by the TEA2260 controller are synchronized to the horizontal retrace pulses. Switching off of the current in the primary winding of the power supply transformer occurs during the horizontal retrace period, when the picture is blanked. The current pulses in the power transformer vary in time for regulating the output voltage at the secondary windings, including the B+ scan supply voltage applied to the horizontal flyback transformer.

The B+ voltage is fed back to the controller in the form of a pulse width modulated signal obtained from a pulse width modulator located on the secondary side, the feedback being coupled to the controller located on the primary side via a signal transformer.

The switched mode power supply remains active in both the run mode and the standby mode, providing power in the standby mode to those circuits which control switching between the run mode and the standby mode, such as the infrared remote receiver and the system microprocessor which monitors the infrared receiver. In the run mode, the switched mode power supply not only powers the active standby switching circuits, but also powers the flyback transformer to drive the horizontal deflection circuit and the flyback derived high voltage power supply. The B+ supply voltage for the flyback transformer is generated whenever pulses are generated by the switched mode power supply controller, i.e., in both the run mode and the standby mode.

To enter the standby mode, the horizontal oscillator is disabled. When no horizontal drive is available, in the absence of horizontal scanning, the TEA2260 controller free runs at a pulse frequency defined by the time constant of a capacitor and resistor coupled thereto, and regulates its output by feedback from a secondary winding of the power transformer which generates the $V_{CC}$ supply voltage to the TEA2260 controller.

There is a substantial difference in current loading of the switched mode supply between the run mode and the standby mode. It is difficult to provide a power transistor capable of driving the primary winding of the power transformer at the relatively high power levels needed for operation in the run mode, and also at the very short pulse widths needed in the standby mode. The TEA2260 has a burst mode to accommodate lower power requirements during standby, and can cease generating pulses, allowing storage capacitors coupled to the standby loads to discharge within a specified range. The burst mode is characterized by periodic occurrences of pulse trains from the switched mode supply controller of sufficient burst duration to drive VCC to an upper limit, followed by a lapse of pulses during which VCC decays to a lower limit.

In the run mode, the TEA2260 controller operates in a slave mode responsive to a master pulse width modulator coupled to an operational supply on the secondary side of the power transformer. In the standby mode, however, the secondary side input from the pulse width modulator is missing, and accordingly the controller assumes a primary regulation mode wherein an error input, derived from $V_{CC}$, is the basis of control. This latter situation characterizes the standby burst mode. In the run mode, when the pulse width modulator is driving the controller, the primary side error input is ignored.

It is a feature of the invention to use the two modes of operation of the switched mode power supply controller as a means to delay disabling of the horizontal oscillator after switching from run to standby, such that the raster collapses and the final anode or ultor supply is discharged. It is another feature of the invention to reduce the level of the B+ scan supply to the flyback transformer over a predetermined interval upon entering the standby mode, during which horizontal scanning and electron beam current continue, but at falling levels. It is a further feature of the invention to utilize signals developed in a switched mode power supply having a slave mode and a free running mode, to control various aspects of a television receiver, including the AC mains startup current supply to the controller as well as the horizontal deflection circuit and the operational loads coupled to the deflection circuit. It is still another feature of the invention to provide a different voltage reference for the switched mode power supply controller in the run mode and the standby mode, higher in the run mode, such that the controller ceases generating output pulses during a transition interval immediately after switching from run to standby, and to use the generation of pulses by the controller in the subsequent burst mode for disabling the horizontal oscillator.

FIG. 1 is a detailed schematic diagram showing a specific embodiment of the invention on the primary side of the power transformer;

FIG. 2 is a detailed schematic diagram showing the circuit on the secondary side of the power transformer;

Figure 3:
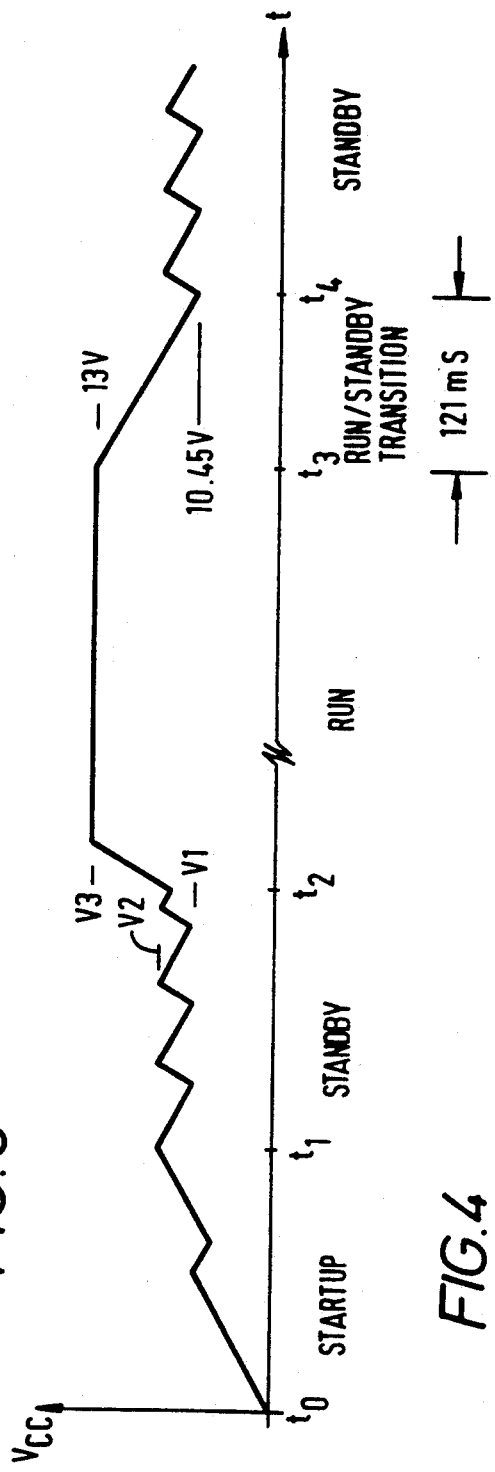
FIG. 3 is a timing diagram showing the $V_{CC}$ power supply level to the switched mode power supply controller during startup, standby, run, and run/standby transition.

In FIGS. 1 and 2, power to a television receiver from an AC mains 22, which can be between 90 and 250VAC FOR operation worldwide, is full wave rectified by a bridge 24 and filtered by a capacitor CP06, to provide the unregulated input voltage $V_{in}$, coupled to a primary winding W1 of a power transformer LP36. The other terminal of winding W1 is coupled to the collector of a power transistor TP29, which is driven by the output of a switched mode power supply controller 20, such as SGS-Thomson Microelectronics, type TEA2260, the respective pin numbers of connections to the controller being shown in the figure.

Controller 20 has two operational modes. In the slave mode, controller 20 is responsive to width modulated pulses fed back from a pulse width modulator 92, shown in FIG. 2. The width of the pulses controls the energy transferred from unregulated input voltage $V_{in}$ to the B+ regulated output and other secondary supplies of transformer LP36. The B+ output is coupled to the primary winding L1 of flyback transformer FBT, for driving horizontal deflection circuit 100 and for coupling power to various loads which are energized only in the run mode of operation of the television receiver.

In a second mode of operation of controller 20, when no width modulated pulses are supplied from the secondary side of the power supply, controller 20 reverts to a primary regulation mode based upon an error input derived from a winding W3 of power transformer LP36. Regulation via the error input is active only in the absence of pulses from the secondary side feedback. Whenever these pulses are present, the error input is ignored. Advantageously, as will be explained later, the regulated $V_{CC}$ output level of the controller is arranged to be substantially higher in the slave mode of operation than in the primary regulation mode.

The television receiver powers up operation in the standby mode, and can be switched into the run mode under control of a microprocessor 82, shown in FIG. 2. Microprocessor 82, as well as power supply controller 20, are powered during both the standby and run modes from power transformer LP36.

When first coupled to AC mains 22, power to the $V_{CC}$ pin of controller 20 is provided by a startup current supply 22 coupled to the unregulated $V_{in}$ voltage from bridge rectifier 24. A filter capacitor CP28, which is coupled to $V_{CC}$ pin 16 of controller 20, is charged through a high valued current limiting resistor RP06 and a forward biased diode DP07. Once controller 20 is operational, its output pulses at pin 14 are coupled to power transistor TP29. The resulting pulses on secondary winding W3 are rectified by a diode DP28, filtered by a capacitor CP17, and coupled to the $V_{CC}$ input of controller 20 through a forward biased diode DP08. The controller thus powers itself after starting initially from the charge supplied to capacitor CP28 from the unregulated $V_{in}$.

Figure 5:
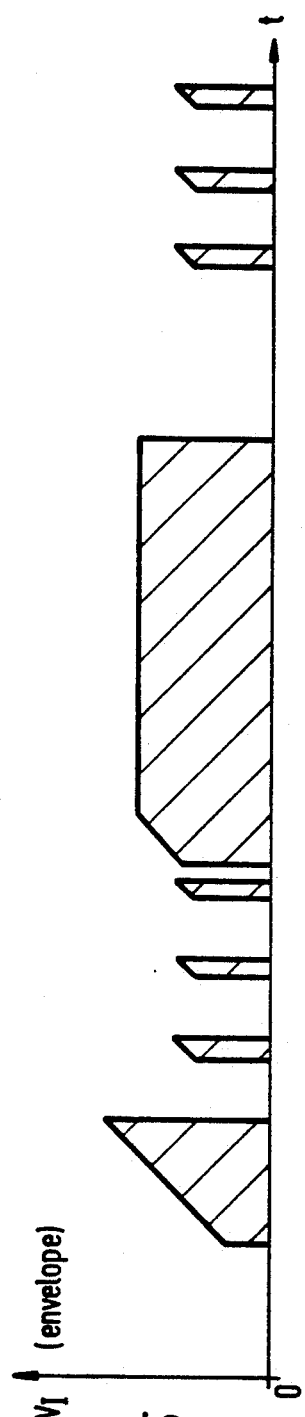
FIG. 5 is a timing diagram showing the pulse envelope of the current in the power transistor switch.
Figure 6:
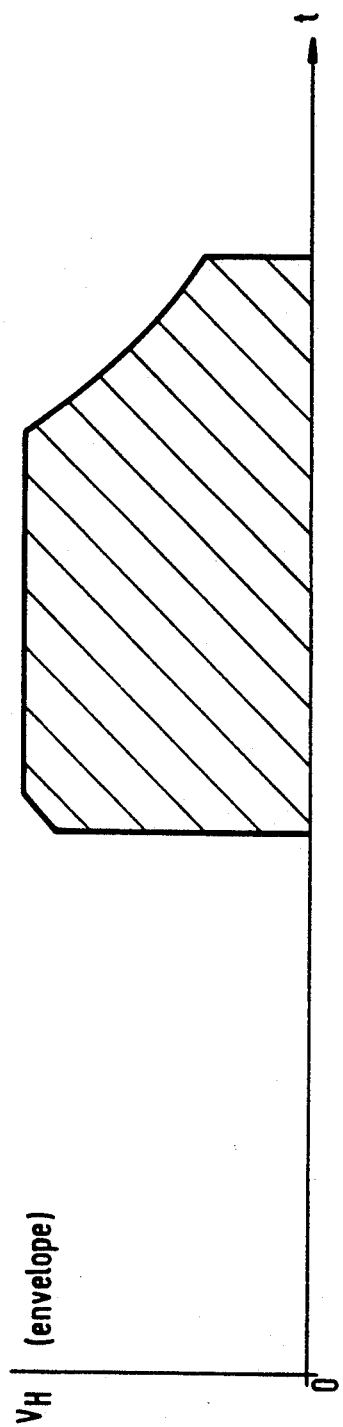
FIG. 6 is a timing diagram showing the pulse envelope of horizontal drive signal during the run mode and the run/standby transition.
Figure 7:
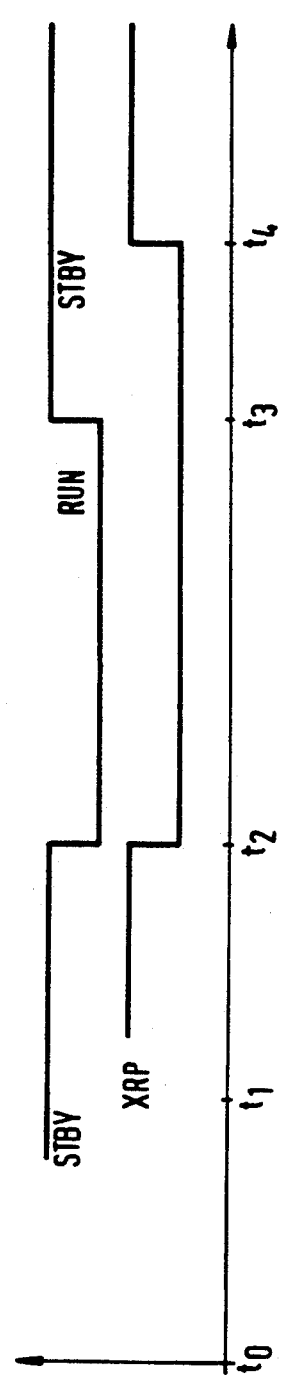
FIG. 7 is a timing diagram showing the logic signals STBY and XRP.

During the startup sequence, when AC mains voltage is first applied, as shown in FIGS. 3 and 5, the voltage at $V_{CC}$ ramps up with charging of capacitor CP28 until controller 20 becomes operational and begins outputting pulses.

Controller 20 has a number of internal limiting and shutdown circuits to prevent overvoltage or overcurrent conditions from occurring or persisting, and can limit its output to safe levels as the power supply powers up. To this end, a soft start circuit 40 is coupled to a capacitor CP08 to define the rate at which the amplitude of successive current pulses VI can increase. Minimum and maximum $V_{CC}$ voltage limits are established by a $V_{CC}$ monitoring circuit 48 and overvoltage comparator 50. Repeated overloads are sensed by a comparator 54, coupled to an external capacitor CP07 and to internal voltage and current references. Maximum output current in power transformer LP36 is limited by current limiting comparators 56, 58, coupled via a resistor RP18 to a current sensing resistor RP32 in series with the emitter of power transistor TP29. The signal at the current sensing resistor is filtered by capacitor CP18. Demagnetization comparator 46 is coupled directly to winding W3 for sensing zero crossings.

In accordance with an inventive feature, the error signal at the inverting input of error amplifier 34 is provided from $V_{CC}$ voltage via a zener diode DP14, which is coupled at its cathode to the $V_{CC}$ terminal and at its anode to ground through a resistor RP16 and to the error amplifier input through a resistor RP15. Zener DP14 breaks down when the $V_{CC}$ voltage developed by winding W3 exceeds 8.2 volts, to supply an error input for comparison with the internal reference 21 coupled to the noninverting input of error amplifier 34. Zener diode DP14 acts as a level shifter, so that any change in the value of $V_{CC}$ appears undiminished at the input of error amplifier 34, so as to provide fine control, and to avoid tripping overvoltage comparator 50.

A negative feedback resistor RP17 is coupled between the output of error amplifier 34 and the inverting input to set the gain of the error amplifier.

When operation of controller 20 has caused $V_{CC}$ to rise to a level high enough that the error amplifier output indicates that an upper threshold voltage level V2 has been reached, controller 20 enters the burst mode and internally revises its operation to track on 90% of the voltage reference level of reference 21 rather than 100%. Generation of pulses ceases and the $V_{CC}$ voltage in capacitor CP28 decreases over a time until the voltage reaches level V1, meeting the 90% threshold. At that point, controller 20 resumes the original threshold and outputs a train of pulses to recharge the output to the 100% reference level, and so forth. The regulated output voltage at $V_{CC}$ defines a series of rising and falling ramp voltages with a hysteresis between the two thresholds, as shown in FIG. 3 between times $t_1$ and $t_2$.

The output of error amplifier 34 is coupled to modulators 36, 38, which are also coupled to a soft start rising reference voltage level obtained from soft start circuit 40 and to the ramp output of an oscillator 42. The modulator outputs are coupled to modulation logic and automatic burst generator 44, the latter being coupled to a pulse output of oscillator 42. The oscillator ramp slope, the pulse width, and the oscillator frequency are set via an external resistor RP09 and an external capacitor CP09.

An IS logic stage 32 preferentially couples via a resistor RP41 the input from the secondary side pulse width modulator through to the output of controller 20. However, when no pulses are received through resistor RP41 during the standby mode, the output of modulator logic element 44 is coupled through to the output of the controller. Regulation pulses from IS logic block 32 are coupled to a logic processor 52, and then through positive and negative driver stages 62, 64 to driver transistors 66, 68, which supply current to or sink current from the output at pin 14 of controller 20.

Startup circuit 22 includes a transistor TP01, in accordance with another inventive feature, that is coupled between current limiting resistor RP06 and ground. During startup, capacitor CP28 charges through resistor RP06 and diode DP07 from the AC mains, and controller 20 begins to regulate $V_{CC}$ TP01 rises with charging of capacitor CP17, and turns on by feedback via zener DP14. The voltage at the base of trasistor TP01 rises with chargins of capacitor CP17, and turns on transistor TP01. The charging current from resistor RP06 is then shunted to ground. With transistor TP01 conducting, a discharge resistor RP21 acts as a fixed load in parallel with storage capacitor CP28 to discharge the capacitor at a fixed rate. By using the load of resistor RP21, variations or tolerances in current loading on capacitor CP28 between different units of the TEA2260 controller can be minimized. This provides a circuit design which has a relatively constant $V_{CC}$ decay rate over a range of controller current loading and at different AC mains voltage levels.

The output of controller 20 at pin 14 is coupled to the base of power transistor TP29 through a network including capacitor CP24 in parallel with series diodes DP24, DP26 and DP27. In the positive phase of the pulsed output of controller 20, diodes DP24, DP26 and DP27 are forward biased and thus define a diode drop voltage of about 2.1 volts for charging capacitor CP24. In the negative phase of the output of controller 20, the accumulated charge in capacitor CP24 helps to sweep out the base charge in power transistor TP29, for stopping conduction of TP29 sharply. Resistor RP28 and inductor LP28 provide pulse shaping to the base of transistor TP29, and resistor RP29 provides base-emitter biasing. On the collector of transistor TP29 a damping network and clamping arrangement is defined by diode DP29 and resistor RP31, with capacitors CP29 and CP31 being coupled in parallel with diode DP29 and resistor RP31, respectively.

Other secondary windings, W2, W4 and W5, provide additional regulated output voltages. The voltage on secondary winding W2 is rectified by a diode DP50 and filtered by a capacitor CP51, providing the regulated B+ output at +118 V for driving the flyback transformer FBT. A +19 V supply is provided by winding W4, as rectified by a diode DP63 and filtered by a capacitor CP64. Winding W5 provides +24 V via a diode DP92 and a capacitor CP86.

The output voltages at all the secondary windings of power transformer LP36 are regulated together in accordance with regulation of $V_{CC}$ by controller 20. Since controller 20 operates in both the run mode and the standby mode, the secondary supplies including the B+ voltage are always generated. The +19 V supply is further regulated to +5 V by a regulator 26, for providing a stable supply voltage to microprocessor 82 notwithstanding the rise and fall of $V_{CC}$ during standby in the burst mode of controller 20, and loading on the B+ supply during run mode.

A horizontal deflection circuit 100 is coupled to primary winding L1 of transformer FBT and includes a horizontal output transistor TL19, which obtains pulses from a horizontal oscillator 86 and a horizontal driver 88. Deflection circuit 100 further includes a damper diode DC, a retrace capacitor CR, a horizontal deflection winding YH and an S-shaping capacitor CS. Secondary windings, L2-L3, of transformer FBT are coupled to run mode loads, not all shown, and are energized only during horizontal scanning. The run mode loads include the picture tube final anode coupled to the ultor supply voltage U, the picture tube or kinescope drivers 84, energized by a +180 V supply derived from winding L4 via a diode DL11 and filtered by a capacitor CL11, and pulse width modulator 92 energized by a +13 V supply derived from winding L2 via a diode DL13 and filtered by a capacitor CL14.

Flyback transformer winding L4 provides flyback pulses at terminal $V_P$, which are fed through pulse width modulator 92 and transformer LP42 to terminal 12 of controller 20, for synchronizing operation of the switched mode power supply with horizontal scanning. In this manner, the point in time when current in power transistor TP29 may be cut off may be positioned during the retrace period, such that energy radiated from transistor TP29 and transformer LP36 during turn off of the transistor will not result in display disturbances. Pulse width modulator 92 is coupled to the B+ regulated voltage via a voltage divider formed by resistors RP51, RP52 and potentiometer PP52. The pulse width modulator supplies pulses via a resistor RP68 to the base of a transistor TP69, the width of the pulses varying with the level of the input from the wiper of potentiometer PP52.

The signal applied to the base of transistor TP69 by the pulse width modulator 92 represents secondary side feedback of the level of the B+ regulated voltage to controller 20. The collector of transistor TP69 is coupled to the primary winding WP of signal coupling transformer LP42, and the emitter is grounded. Provided there is a supply voltage at point P coupled to winding WP, transistor TP69 conducts and applies the width modulated pulses to primary winding WP. Resistor RP60, in parallel with winding WP, provides transient damping. The width modulated pulses are coupled to the slave input pin 2 of controller 20 through the secondary winding WS and resistor RP41, for regulating the B+ voltage in the run mode.

Transformer LP42, as well as power transformer LP36, isolate the hot or mains referenced ground on the primary side of power transformer LP36 from the cold or chassis ground on the secondary side of the transformer.

The supply voltage P is derived in accordance with the STBY output of microprocessor 82. Voltage P is present in the run mode and is absent in the standby mode. Signal STBY is coupled to the emitter of a transistor TR16; the base of transistor TR16 is coupled to the +5 V supply through a resistor RR15. The +5 V supply, which is regulated from the +19 V supply obtained from winding W4, is available during both the run and standby modes and powers microprocessor 82. When entering the run mode, microprocessor 82 pulls the STBY signal low, allowing transistor TR16 to conduct. The collector of transistor TR16 is coupled to the base of a transistor TR17 through a resistor RR16. Transistor TR17 is biased by resistor RR17, with the emitter of transistor TR17 being coupled to the +24 V supply, is also available during both run and standby. When STBY is low, voltage P is +24 V and when STBY is high, voltage P is absent.

Voltage P provides power to winding WP of signal transformer LP42 and to the horizontal oscillator $V_{CC}'$ input through a diode DP05, which diode provides voltage FK at its cathode. Voltage FK is coupled to $V_{CC}'$ of horizontal oscillator 86 through a resistor RP07, and $V_{CC}'$ is filtered by a capacitor CI21.

Voltage FK is voltage divided by resistors RV04 and RV02 and applied to the base of a transistor TV02. The collector of transistor TV02 is coupled to the safety shutdown input XRP of integrated circuit IL01, which includes horizontal oscillator 86. A signal at the XRP input blocks the output of the horizontal oscillator. The XRP input is high true, and is held low by transistor TV02 during run mode operation when voltage P is high. There are a number of ways in which the XRP signal can block the output of the horizontal oscillator. In FIG. 2, this function is shown generally by an internal latch 23 coupled to the output of horizontal oscillator 86 and to a pullup resistor 24 coupled to the horizontal oscillator $V_{CC}'$.

When voltage P is absent during standby, transistor TV02 is not conducting. When transistor TV02 is not grounding the XRP input, the XRP input can be driven high by a signal XR, derived via a resistor RV01 from the voltage developed by winding W4 of power supply transformer LP36, after rectification by a diode DV01 and filtering by a capacitor CV01.

Referring to the timing diagrams of FIGS. 3 through 7, according to an inventive feature, a transition interval is defined between the run mode and the standby mode. The transition interval is accurately terminated by making use of the output of controller 20 to activate the XRP input of IL01 to block horizontal pulses from the output of oscillator 86. The two modes of operation of the switched mode power supply controller 20, run and standby, form a means to delay disabling of horizontal oscillator 86, such that the raster collapses gradually and the anode voltage U is discharged when switching into the standby mode from the run mode. The level of the B+ supply to the flyback transformer FBT collapses gradually during the transition interval before entering the standby mode. During this transition interval, horizontal scanning and electron beam current continue at falling amplitudes.

Figure 4:
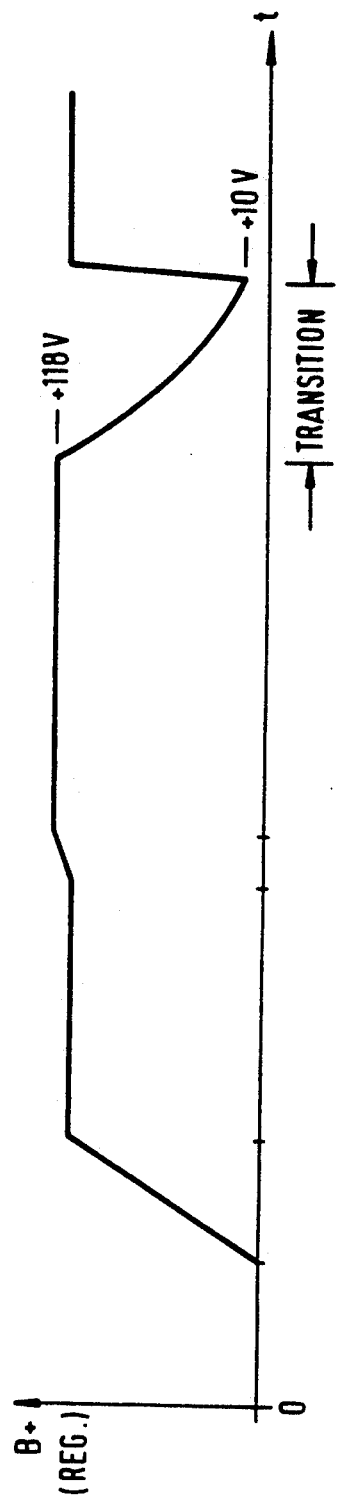
FIG. 4 is a timing diagram corresponding to FIG. 3 and showing the B+ voltage level on the primary winding of the flyback transformer.

Following the startup interval, after time $t_1$, controller 20 maintains $V_{CC}$ at a level between the upper and lower thresholds, V2 and V1, defined in the burst mode, thereby providing a series of rising and falling ramps between the two thresholds as shown in FIG. 3. During standby, from time $t_1$ to $t_2$, controller 20 provides occasional bursts of pulses to power transformer LP36, as shown in FIG. 5, to maintain $V_{CC}$ between the two error input thresholds of controller 20. Because the B+ supply voltage is unloaded, it remains near its run mode level of +118 V, as shown in FIG. 4.

When microprocessor 82 switches into the run mode at time $t_2$, due to a signal from an infrared remote control receiver, not shown, STBY is pulled down and the voltage P is brought to +24 V by transistors TR16 and TR17. Voltage P then supplies power to the $V_{CC}'$ input of horizontal oscillator 86, and couples width modulated pulses from pulse width modulator 92 to controller 20 through signal transformer LP42. Feedback to controller 20 shifts from the internal reference coupled to error amplifier 34 to the pulse width modulator output signal coupled to IS logic block 32 through transformer LP42.

The pulse width of the width modulated pulses by modulator 92 is based on the B+ voltage as established by the voltage divider of resistors RP51, RP52 and potentiometer PP52. The feedback is arranged to maintain the B+ voltage at +118 V.

Power is supplied via controller 20 and power transformer LP36 to the B+, +19 V, +24 V and +5 V supplies, and via transformer FBT to the ultor voltage U, +13 V and +180 V supplies. Due to the substantial loading in the run mode, controller 20 operates in the normal mode rather than the burst mode, and outputs width modulated current pulses (envelope shown in FIG. 5) during each horizontal scan synchronously with the flyback pulses on signal $V_P$.

In accordance with an inventive feature, the switched mode power supply is so constructed and the operating parameters are so selected to generate a $V_{CC}$ voltage level V3 during run mode, of e.g. +13 V, a level that is substantially higher than the $V_{CC}$ upper threshold level V2 established during standby. This results in a long transition interval $t_3$–$t_4$ from the termination of run mode operation to the initiation of standby mode operation, for purposes to be explained further.

At time $t_3$, in response to, for example, a remote control receiver (not shown), microprocessor 82 shifts into standby mode and allows signal STBY to go high. The circuit begins the transition interval from run to standby. At time $t_3$, voltage P immediately goes low in response to the STBY signal going high, see FIG. 7, thus blocking feedback of pulses through signal transformer LP42 to controller 20 due to lack of collector voltage for transistor TP69.

As of time $t_3$, controller 20 begins to regulate based upon the input at error amplifier 34. However, the error input is designed to regulate between the upper and lower threshold reference levels, V2 and V1, established by reference source 21, as discussed above. These levels are lower than the +13 V level V3 existing at the $V_{CC}$ pin at the end of the run mode operation at time $t_3$. Controller 20 therefore enters the burst mode and ceases generating pulses until the $V_{CC}$ voltage across capacitor CP28 falls to the lower V1 level, 10.45 V (FIGS. 3 and 5), corresponding to a level of 2.25 V at pin 6. The discharge rate of capacitor CP28 and thus the duration of the transition interval is precisely controlled in accordance with the value of discharge resistor RP21 and the VCC voltage level V3.

In the transition from run to standby the horizontal deflection circuit continues to operate. Moreover, because diode DR10 is reversed biased, it no longer blocks the +5 V level from being coupled to kinescope drivers 84 through diode DR11. The kinescope drivers turn on and provide electron beam current. However, the B+ voltage, which is loaded during the transition between $t_3$ and $t_4$ by the deflection circuit and its flyback coupled loads, begins to fall as shown in FIG. 4. The level of the output $V_H$ of horizontal oscillator 86 also falls due to the slow decay of the IL01 $V_{CC}$ voltage in capacitor CI21 (see FIG. 6). The raster collapses with the drop in deflection current in horizontal deflection winding YH. At the same time, anode voltage U discharges.

The time delay of the transition upon entering the standby mode is defined by the difference between the run mode regulated level of $V_{CC}$ to controller 20 of about +13 V and the lower threshold of controller 20 in the burst mode of about +10.45 V, and also by the discharge of capacitor CP28 through discharge resistor RP21, and zener diode DP14. The high level of $V_{CC}$ in the run mode is set below the overvoltage cutoff of controller 20, which in the TEA2260 is 15.7 V. According to the embodiment shown, the transition lasts 121 milliseconds.

When $V_{CC}$ at controller 20 reaches the low threshold at time $t_4$, the transition period ends. Pulses reappear at the output of controller 20 and operate power transistor TP29 to generate pulses in transformer LP36, including in secondary winding W2, thereby driving the B+ voltage from its very low, discharged level back to near its nominal level of +118 V.

Because the horizontal oscillator is still operating at the end of the transition interval, the return of the B+ voltage would resume deflection and generation of power to the ultor and kinescope drivers 84. According to an inventive feature, the resumption of pulses on the output of controller 20 at the end of the transition interval is used to positively switch off the output of horizontal oscillator 86, using the XRP input to integrated circuit IL01.

When controller 20 resumes generating pulses at time t4, pulses generated in secondary winding W4 are coupled through a resistor RV01 as pulse voltage XR. The voltage is peak rectified by diode DV01 and filtered by capacitor CV01, driving high the XRP input to integrated circuit IL01. Horizontal pulses $V_H$ are thus cut off precisely at time t4, immediately before the B+ voltage is driven back to +118 V by controller 20.

In this way, the ultor voltage is drained by continued operation of the kinescope drivers as the B+ voltage and raster collapses. Controller 20 precisely times the collapse of the raster and discharge of the ultor capacitance and positively blocks the horizontal oscillator output at the conclusion of the transition interval.

What is claimed is:
1. A television receiver comprising:
   a switched mode power supply for regulating an output voltage by generation of output pulses, the output voltage being coupled to an input of a power supply controller by a feedback loop means; characterized by
   means, responsive to a run/standby mode command signal, coupled to said controller, for stopping generation of output pulses for a predetermined interval during a transition between run and standby modes.

2. The television receiver according to claim 1, wherein the switched mode power supply is coupled to a B+ supply for a primary winding of a flyback transformer in a horizontal beam deflection circuit, and further comprising a horizontal oscillator operable to apply pulses to the horizontal beam deflection circuit, and a pulse width modulator providing width modulated pulses as a function of the value of the B+ supply, the feedback loop means including a first feedback loop coupling the width modulated pulses to the switched mode power supply and a second feedback loop coupling the output voltage to the switched mode power supply.

3. The television receiver according to claim 2, comprising a power transformer coupled to the power supply controller of the switched mode power supply, the power supply applying pulses to the primary winding of the power supply transformer, and the second feedback loop being coupled to a secondary winding of the power transformer for regulating the output voltage in the absence of pulses from the pulse width modulator.

4. The television receiver according to claim 3, wherein secondary windings of the power transformer are coupled to standby loads of the television receiver and are powered in both run and standby modes, and secondary windings of the flyback transformer, coupled to run loads of the television receiver, are powered only during horizontal scanning.

5. The television receiver according to claim 2, further comprising switching means operable to enable and disable the horizontal oscillator to define a run mode when the horizontal oscillator is enabled and a standby mode wherein the horizontal oscillator is disabled, and wherein a transition from the run mode to the standby mode includes operation of the horizontal oscillator for a predetermined interval after switching from the run mode to the standby mode.

6. The television receiver according to claim 5, wherein the power supply controller has an operational mode wherein pulses are output continuously, and a burst mode wherein pulses are output intermittently, to drive the output voltage between a lower threshold and an upper threshold, and wherein the output voltage is regulated to a higher level in the continuous mode of the power supply controller than in the burst mode, whereby upon switching from the operational mode to the burst mode the controller ceases generating pulses until the output voltage falls to the lower threshold, thereby defining a delay in generation of pulses.

7. The television receiver according to claim 5, wherein the horizontal oscillator is coupled in the run mode to a power supply voltage derived from a secondary winding of the power transformer and to a storage capacitor, and wherein the switching means includes a microprocessor controller operable to decouple the horizontal oscillator from said secondary winding in the standby mode, whereupon power to the horizontal oscillator decreases with discharge of the storage capacitor.

8. The television receiver according to claim 1, further comprising a startup current supply to the power supply controller comprising a current limiting resistor and a storage capacitor coupled to a power supply input to the power supply controller and to a DC voltage derived from an AC mains supply, and further comprising a dummy load resistor coupled to the storage capacitor, and switching means coupled to the dummy load resistor, the switching means being operable after startup to drain the storage capacitor through the dummy load resistor, whereby the dummy load resistor substantially defines a discharge rate of the storage capacitor in the free running mode.

9. The television receiver according to claim 1, further comprising a zener diode coupled between the power supply input to the power supply controller and an error input to the power supply controller, the zener diode defining a reference level to the power supply controller in the free running mode.

10. The television receiver according to claim 1, further comprising a flyback transformer coupled to a voltage produced at a secondary winding of the power transformer, wherein the power transformer defines an isolation means between a hot ground on a primary side of the power transformer and a cold ground on a secondary side of the power transformer, and further comprising a signal transformer operable to couple flyback pulses from the flyback transformer to provide the input pulses to the power supply controller.

11. A television receiver according to claim 1, wherein the means for stopping generation of output pulses for a predetermined interval comprises means for lowering the second output voltage upon switching from the slave mode to the free running mode.

12. A television receiver according to claim 1 comprising means for generating output pulses during the free running mode, in bursts, separated by periods when the output pulses are absent.

13. A television receiver, comprising:
a horizontal deflection circuit including a flyback transformer having a plurality of operational loads coupled to secondary windings thereof;
a horizontal drive circuit coupled to a primary winding of the flyback transformer, operable in a run mode of the television receiver to apply flyback pulses to the horizontal deflection circuit, said flyback pulses being absent in a standby mode of the television receiver;
a switched mode power supply for regulating at least a B+ output voltage coupled to the primary winding of the flyback transformer by generation of output pulses, said flyback pulses being coupled to the power supply for synchronization and at least one signal reflecting the B+ voltage being coupled along a first feedback loop to a sense input of the power supply, the power supply having a slave mode wherein the power supply is responsive to the signal on the first feedback loop, and a free running mode wherein the power supply in the absence of said signal on the first feedback loop regulates an output supply level of the power supply by varying the output pulses based on a reference level applicable to a second feedback loop;
the supply level regulated by said second loop being sufficiently different from the supply level regulated by said first loop to block the power supply from generating pulses.

14. The television receiver according to claim 13, wherein the switched mode power supply comprises a power supply controller, and further comprising switching means operable to establish a standby mode and a run mode of the television receiver, the switching means being coupled into the first feedback loop for blocking pulses to the power supply controller for forcing the power supply controller into the free running mode.

15. The television receiver according to claim 13, further comprising a power transformer having a primary winding coupled to the power supply controller, and wherein the power transformer includes secondary windings for generating the B+ output voltage and at least one additional output voltage, the additional voltage being coupled to supply power to the power supply controller.

16. The television receiver according to claim 14, wherein the power supply controller has a power input coupled to the additional voltage, and wherein the second feedback loop couples the power input to an error input of the power supply controller.

17. The television receiver according to claim 15, further comprising a zener diode coupled between said additional output voltage and the sense input, for setting a threshold level of the power supply controller.

18. The television receiver according to claim 16, further comprising a startup current supply having a current limiting resistor coupled to a voltage derived from AC mains coupled to the receiver, and a storage capacitor coupled to the power input and to the current limiting resistor, the storage capacitor providing power for initial operation of the power supply controller upon initial coupling of power to the receiver on the AC mains.

19. The television receiver according to claim 18, further comprising a dummy load resistor and a switching means operable to discharge the storage capacitor through the dummy load resistor when the power supply controller is operative.

20. The television receiver according to claim 19, wherein the power input of the power supply controller is coupled to a secondary winding of the power transformer through a rectifier, and wherein the switching means includes a transistor coupled to the dummy load resistor for discharging the storage capacitor when the power supply controller applies pulses to a primary winding of the power transformer.

21. The television receiver according to claim 14, further comprising a signal transformer coupled to the flyback transformer and to a pulse input of the power supply controller for coupling flyback pulses to the pulse input the pulse input taking precedence over an error input to the power supply controller coupled to a secondary winding of the power transformer, a pulse width modulator being coupled in the first feedback loop including said signal transformer.

22. The television apparatus according to claim 20, further comprising a microprocessor and a switching transistor coupled to the microprocessor and to a voltage supply derived from a secondary winding of the power transformer, the microprocessor producing a run/standby signal and the switching transistor coupling the voltage supply to the signal transformer only in the run mode, for enabling operation of the first feedback loop.

23. The television receiver according to claim 22, further comprising a high voltage screen anode and at least one kinescope driver for coupling beam current to the screen anode, the kinescope driver being coupled to the run/standby signal of the microprocessor for enabling the kinescope driver during collapse of the picture, whereby the screen anode is discharged during transition into the standby mode.

24. A television receiver operable in a run mode and in a standby mode, comprising:
a power supply which generates a first predetermined regulated voltage during the run mode; said power supply generating a second predetermined regulated voltage during the stanby mode, the period of time between the initiation of the standby mode and the occurrence of the standby mode being the transition from run mode to standby mode;
means for switching said power supply from a run mode to a standby mode;
a horizontal oscillator operable in said run mode; and
means for maintaining said horizontal oscillator operative during the transition from said run mode to said standby mode.

25. A television receiver as in claim 24, comprising means to interrupt operation of said horizontal oscillator at the end of the transition from run mode to standby mode.

26. A television receiver operable in a run mode and in a standby mode, comprising:
a power supply which generates a first predetermined regulated voltage during the run mode;
a filter capacitor coupled across said power supply, said power supply generating a second predetermined regulated voltage during the standby mode;
means for switching said power supply from a run mode to a standby mode;
the period of time between the initiation of the standby mode and the occurrence of the standby mode being the transition from run mode to standby mode; and means for controllably discharging said capacitor during said transition.

27. A television receiver operable in a run mode and in a standby mode, comprising:

a power supply which generates a first predetermined regulated voltage during the run mode, and a second predetermined regulated voltage during the standby mode, means for generating a first command signal to initiate a transition between run and standby modes, and means for generating a second command signal which is shifted in time relative to the first command signal to initiate transition of a power supply load circuit between run and standby modes.

28. A television receiver as in claim 27, in which said load circuit is a deflection circuit.

* * * * *